United States Patent [19]

Dickinson et al.

[11] Patent Number: 4,951,231
[45] Date of Patent: Aug. 21, 1990

[54] IMAGE DISPLAY SYSTEM WITH TRANSFORMATION OPERATION ORDERING

[75] Inventors: Barry Dickinson, Southhampton; David J. Friend, Eastleigh; Ian G. Holden; Paul H. Jackson, both of Winchester, all of England; Robert J. Padzieski, Rochester, Minn.

[73] Assignee: International Business Machines Corporation, Armonk, N.Y.

[21] Appl. No.: 414,735

[22] Filed: Sep. 27, 1989

Related U.S. Application Data

[63] Continuation of Ser. No. 62,273, Jun. 15, 1987, abandoned.

[30] Foreign Application Priority Data

Jun. 16, 1986 [EP] European Pat. Off. .......... 6304621.5

[51] Int. Cl.$^5$ ............................................. G06F 15/62
[52] U.S. Cl. ................................... 364/521; 340/724
[58] Field of Search ................ 364/521, 522; 340/723, 340/724, , 727, 729, 731

[56] References Cited

U.S. PATENT DOCUMENTS 4,555,775 11/1985 Pike ...................................... 364/900
4,748,572 5/1988 Latham ........................... 364/522 X

FOREIGN PATENT DOCUMENTS 0166304 1/1986 European Pat. Off. .

Primary Examiner—Gary V. Harkcom
Assistant Examiner—Mark K. Zimmerman
Attorney, Agent, or Firm—Mark S. Walker; F. D. Poag

[57] ABSTRACT

An image data display system in which more than one portion of an image displayed on a screen may be transformed by extraction, scaling or rotation in relation to other areas of the screen concurrently. The image display system is of the type which is capable of receiving transformation operation orders from a control processor prior to being sent the image. As the image is received, the display system performs the transform operations prior to displaying the image data. The control processor is modified to include means to determine when two or more concurrent transforms of portions of an image will cause the portions to be displayed on common areas of the display screen (or overlap) and, means to order and transmit to the display device the list of transforms to be performed so that the image pel definition signals are transmitted to the display device where image portions occupy common areas of the display screen the pel definition signals relating to higher priority portion of the image control the final content of the common areas of the displayed image.

3 Claims, 3 Drawing Sheets

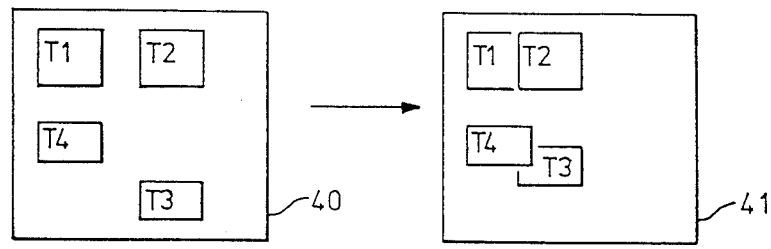
FIG. 4A
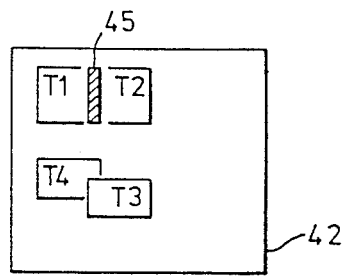
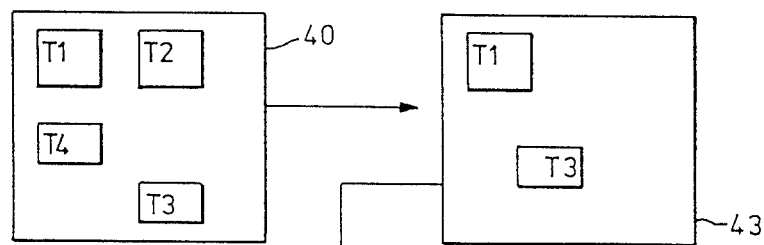
FIG. 4B
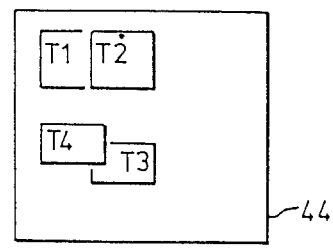

IMAGE DISPLAY SYSTEM WITH TRANSFORMATION OPERATION ORDERING

This is a continuation of application Ser. No. 07/062,273, filed June 15, 1987, now abandoned.

BACKGROUND OF THE INVENTION

1. Field of the Invention

This invention relates to an electronic picture display system wherein discrete image defining signals control a raster scan display screen In particular the invention relates to a display system in which image pel definition signals are stored in a data processor system along with a list of operations which are to be applied to the image pel definition signals prior to them being displayed Both the image pel definitions and the list of operations are transmitted in response to control signals to a raster scan display device containing appropriate data processing capability to perform the list of operations to the image pel definitions, and to display the resulting image on the display surface.

2. Description of the Related Art

In this description the term 'image' is used to mean a picture that is defined by a series of discrete picture elements (pels) and can be displayed on a display screen such as a raster driven cathode ray tube. This use is to distinguish from a graphic picture which is made up of lines and areas and is stored as signals that define the coordinate positions of line endings and the background of areas.

A pel may vary in size and density depending upon the characteristics of the display device.

The magnification or scale of an image is changed by varying the number of pels used to display the whole or part of the image.

A transform operation is an operation on the whole or a selected portion of an image to change, for example, its scale, its orientation or its position relative to the rest of the screen.

There are today output devices which support image datastream containing image transform operations such as Extract rectangle, Scale rectangle, Orientate rectangle, Reflect rectangle and Place rectangle, which are transmitted to the display device before transmitting the image on which they are to be performed. The display device then performs the operations on each row or raster line of image data as they are received, (i.e. row by row from top to bottom of the image), applying the required transform operations on it, and placing it on the display surface at the positions defined by the Place rectangle operations. Image data which does not fall inside an Extract rectangle is discarded. This approach means that the device does not require storage in which to buffer the entire image data signals, prior to applying the requested transform operations, hence the production cost of each device is significantly reduced.

One of two problems may arise however, when two or more transformed rectangles are placed such that they overlap on the display surface with the overlapping portions being combined using a mixing or merging algorithm which is not commutative. A commutative mixing algorithm is one which produces the same result when image A overlaps image B as when image B overlaps image A. An example of a non-commutative mixing algorithm is "OVERPAINT", if image A Overpaints a portion of image B them that portion of image B is completely obscured.

The first problem is caused by transformed rectangles being placed on the screen in the order that the row or raster lines which define the Extract rectangles are positioned in the incoming image data signals, (i.e. from top to bottom of the source image), rather than in the order they are defined by the transform operations. This results for instance, in image B being overwritten by image A, instead of A being overwritten by B.

The second related problem occurs when Extract rectangles overlap vertically in the incoming source image, and their transformed rectangles are to be placed such that they overlap on the display surface. This results in an interference pattern appearing within the overlapping area, as the transformed rectangles are written onto the screen, with successive rows from each of the rectangles in turn being placed on the screen so that they overlap rows which have previously been placed and which form part of the other rectangles.

SUMMARY OF THE INVENTION

The present invention provides a solution to the above problems by modifying the processing capabilities of a host processor to determine when two or more transforms will result in either a lower priority image portion (rectangle) overlaying a higher priority image portion or if the results of the transforms will cause the portions to occupy a common area of the display screen and give rise to an interference pattern. If either condition is detected the host processor modifies the order in which the transforms are presented to the application by the display device.

An advantage of the invention is that it provides the means to overcome one of the most serious limitations inherent in the design of low cost image displays and at the same time minimizes the amount of data signals which must be sent to the display device for any given image.

According to the invention there is provided a data display system in which image data are stored as a series of raster scan pel definition signals in a data processor system and the position and size of selected portions of an image to be displayed on a display screen of a display device can be transformed in response to input signals received from a controlled input device, characterized in that the display device includes a control program store in which are stored control programs for a plurality of transform operations and the data processor control system includes, means to determine when two or more concurrent transforms of portions of an image will cause the portions to be displayed on common areas of the display screen, means to order and create a list of the transforms and, means to transmit signals defining the ordered list of transforms to the display device, so that when the image pel definition signals are transmitted to the display device, where image portions occupy common areas of the display screen the pel definition signals relating to higher priority portion of the image control the final content of the common areas of the displayed image.

BRIEF DESCRIPTION OF THE DRAWING

In order that the invention may be fully understood a preferred embodiment thereof will now be described with reference to the accompanying drawings in which:

FIGS. 4A and B illustrate a specific example of the operation of the invention.

DESCRIPTION OF THE PREFERRED EMBODIMENT

Figure 1:
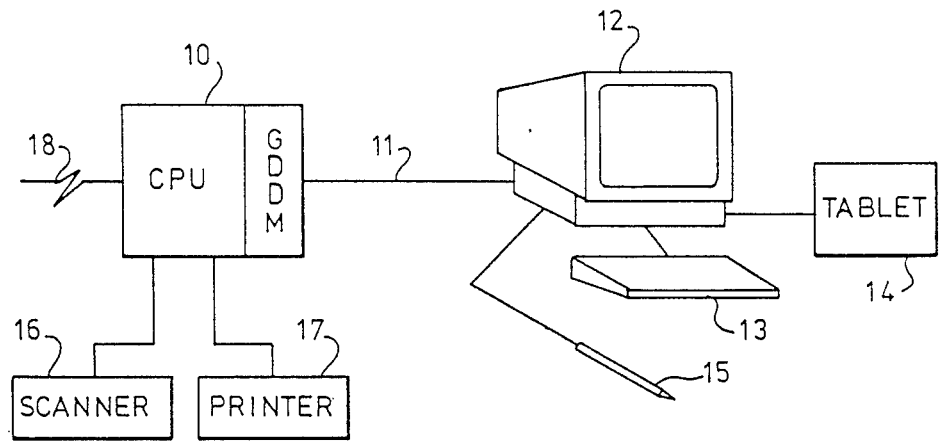
FIG. 1 illustrates the component parts of an image data display system.

Referring now to FIG. 1, there is shown a host processor 10 which is connected over a communication link 11 to a display system that includes a display device 12, and various user operated input devices such as a keyboard 13, a tablet 14, and a light pen 15. The host processor may have a direct input from a digital scanner device 16 and an output connection to a printer or plotter 17. A telecommunication link 18 provides an input and output connection to and from devices.

The display device 12, which may be an IBM 3193 (IBM is a Registered Trademark), includes a screen refresh buffer, a microprocessor and a control program store, usually a read only memory (ROM). The control program store includes the microcode to control the transform operations. When a transform is to be made upon the image data signals received from the host processor 10 the appropriate microcode is invoked from the control program store which then controls the microprocessor to place the image data pel definition signals, as they are received, into the required screen refresh buffer locations.

The host processor 10, contains a control system that has several different layers of operating programs, each controlling a different aspect of the machine's operation. The operation program with which the present invention is concerned controls the picture manipulation functions of the processor. An example is the IBM Graphic Data Display Manager (GDDM). GDDM is a product which provides an application interface to a large number of input and output devices such as displays, printers, plotters and scanners in the IBM 370 environment, as well as supporting the creation and editing of both graphic and image pictures.

The most commonly required operation to be performed on an image, in a paperless office environment, is to extract part of a source image, perform some manipulation on it, and place it in a target image (or on a display presentation space).

Figure 2:
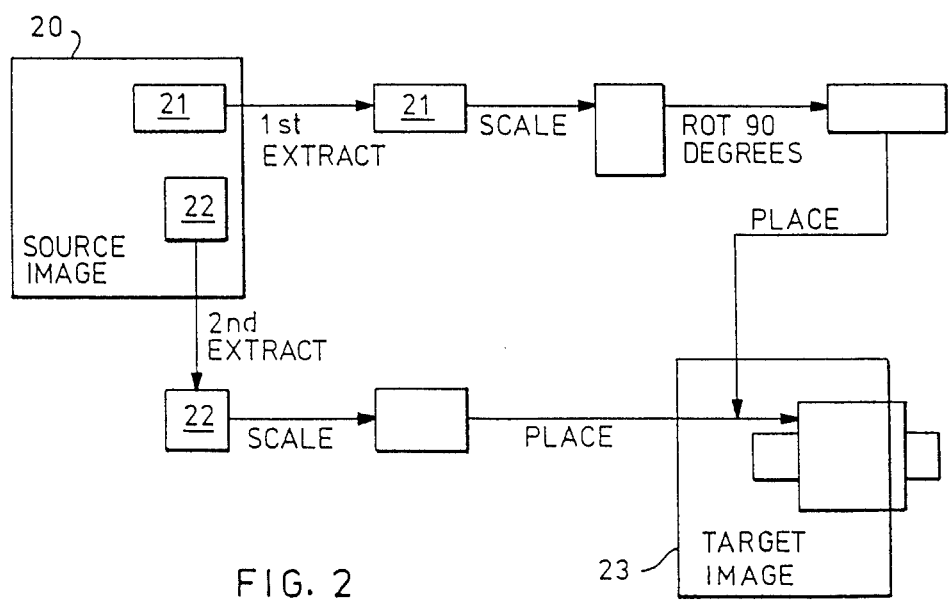
FIG. 2 illustrates a multiple extract-place operation.

This is illustrated in FIG. 2 which shows a source image 20 that has two portions 21 and 22 that are to be extracted and transformed.

The first portion 21 is the first extracted and has its scale changed and then rotated through 90 degrees. It is then placed in the target image 23.

The second portion 22 is extracted and has its scale changed and then placed in the target image 23.

Portion 22 now overlaps 21 and both have areas outside the target image boundary. In a top to bottom raster scan operation portion 22 will appear on top in the final image even though portion 21 was given the higher priority.

The following terms are used throughout this section. The sequence of operations beginning with an Extract rectangle order, followed by a sequence of manipulation functions, and ending with a place order, is referred to as a "Transform". A list of such transforms is called a "Projection". The area of the source image defined by an extract operation is referred to as an "extract rectangle". The resulting area, after the required manipulation functions have been applied to an extract rectangle is referred to as a "transformed rectangle".

Figure 3:
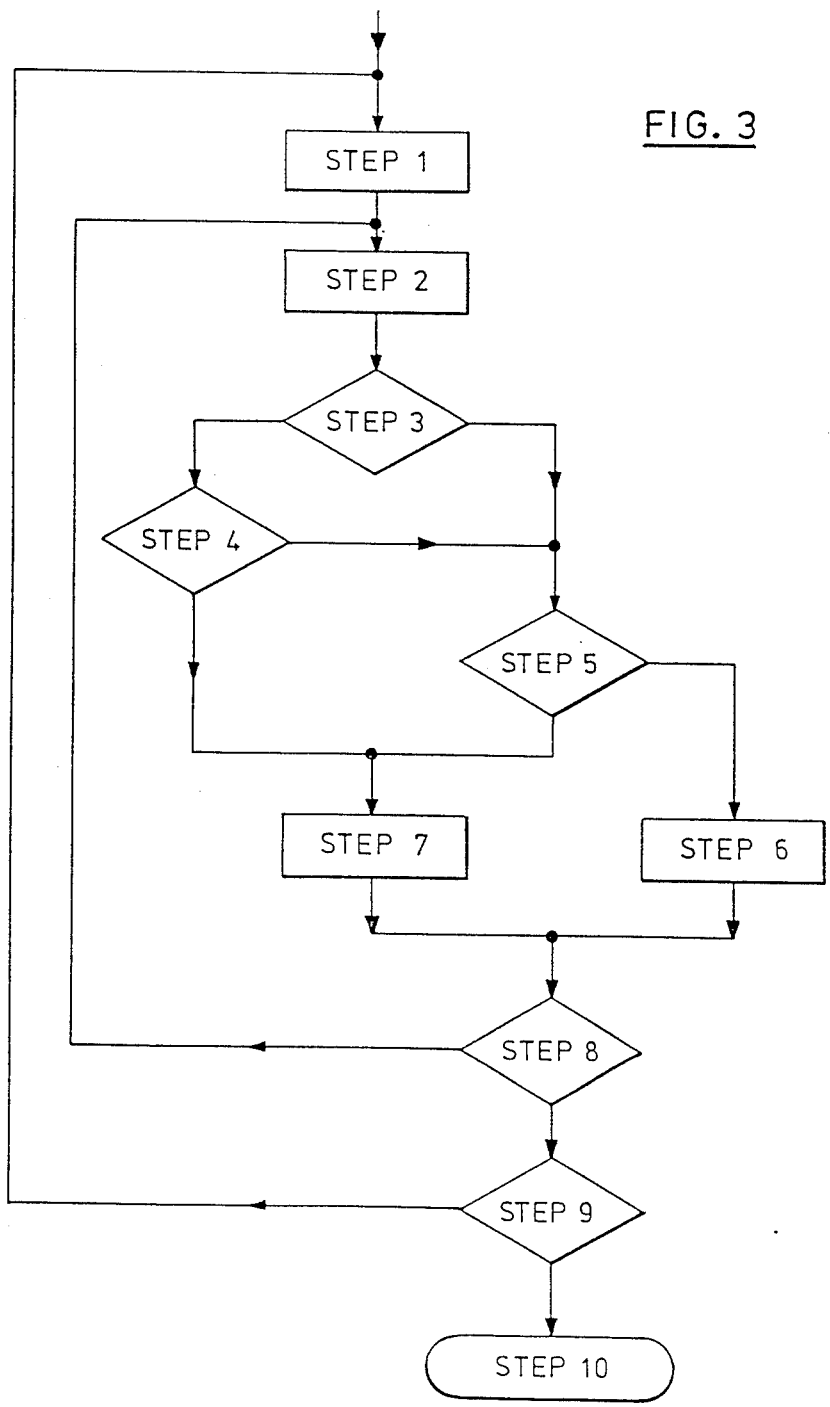
FIG. 3 is a flow diagram of the operation of the invention.

FIG. 3 is a flow diagram of the operations of the invention that are performed by the processor under the control of the picture manipulation control program, (GDDM).

In order to initialize the operation the processor requires as input a list of transforms PO, and the resolution of both the source image and the target device.

The steps of the process are as follows:

Step 1: Create two empty projections (DEV-PROJ and WORK-PROJ), to which transforms may be transferred from the original projection PO during the following operations.

Create two lists (DEV-RECT-LIST and WORK-RECT-LIST) of records of type TAR-RECT. TAR-RECT contains fields to hold the left, right, top and bottom edge coordinates of a transformed rectangle, and a field to hold the mixing algorithm to be used when merging it with other rectangles.

Create LOWEST-EXTRACT to hold the edge coordinate of the bottom edge of an extract rectangle order This is initially set to −1.

Let the current transform identify the transform being processed. This is initially set to identify the first transform in PO.

Step 2: Calculate the left, right, top and bottom edge coordinates of the transformed rectangle corresponding to the current transform, as it will be positioned on the screen.

This is done by taking the size of the extract rectangle in pixels, x-size - right edge minus left, y-size=top edge minus bottom, and the x and y-resolution (the number of pixels/inch, initially the same as the source image), and applying the scale, orientate, reflect, manipulations in the order they are defined in the transform to the image x- and y-sizes and to the x- and y-resolutions, to obtain the transformed size and resolution of the extracted image. No actual image data is processed. Thus:

scale: The x- and y-sizes are multiplied by the relevant x and y scale factors.

reflect: For reflection about the leading or trailing 45 degree diagonal the x- and y-sizes are interchanged; the x and y-resolutions are also interchanged. For left-to-right and top-to-bottom reflection, there is no change.

orientate: For 90 and 270 degree orientations, the x- and y-sizes are interchanged; the x and y-resolutions are also interchanged. For 0 and 180 degree orientation, there is no change.

If the transformed image x or y-resolution is different than that of the target image, the transformed x-size is divided by the transformed image resolution and multiplied by the target image resolution The same is done for the y-size. Finally the place position for the transform is combined with the transformed x and y-sizes to give the edge coordinates of the transformed rectangle as it will be positioned on the screen. (to Step 3).

Step 3: If the y-coordinate of the top edge of the extract rectangle is greater than LOWEST-EXTRACT (i.e. if the top edge of the current extract rectangle appears below the bottom edge of any extract rectangle currently in DEV-PROJ) then go to Step 5, otherwise go to Step 4.

Step 4: If DEV-RECT-LIST is empty, go to Step 5, otherwise perform the following test on each TAR-RECT in DEV-RECT-LIST: CURRENT-RECT refers to the TAR-RECT currently being tested.

If CURRENT-RECT (mixing algorithm) is not the same as the mixing algorithm for the current transform or CURRENT-RECT (mixing algorithm) is not commutative (e.g. is OVERPAINT or subtract) then, if the transformed rectangle overlaps the RECTANGLE defined in CURRENT-RECT (i.e. if TRANSFORMED-RECT(left)≦CURRENT-RECT(right) and TRANSFORMED-RECT(right)≧CURRENT-RECT(left) and TRANSFORMED-RECT(top)-≦CURRENT-RECT(bottom) and TRANSFORMED-RECT(bottom)≧CURRENT-RECT(top)) then go to Step 7.

Go to Step 5.

Step 5: If WORK-RECT-LIST is empty, go to Step 6. Perform the following test on each TAR-RECT in WORK-RECT-LIST: CURRENT-RECT refers to the TAR-RECT currently being tested.

If CURRENT-RECT (mixing algorithm) is not commutative, or the mixing algorithm for the current transform is not commutative (e.g. OVERPAINT or subtract) then, if the transformed rectangle overlaps the RECTANGLE defined in CURRENT-RECT (i.e. if TRANSFORMED-RECT(left)≦CURRENT-RECT(right) and TRANSFORMED-RECT(right)-≧CURRENT-RECT(left) and TRANSFORMED-RECT(top)≦CURRENT-RECT(bottom) and TRANSFORMED-RECT(bottom)≧CURRENT-RECT(top)) then go to Step 7.

Go to Step 6.

Step 6: Move or copy the transform from PO to the end of DEV-PROJ. Add a new TAR-RECT to DEV-RECT-LIST, containing the transformed rectangle coordinates and the mixing algorithm for the current transform. If the bottom edge coordinate of the extract rectangle is greater than LOWEST-EXTRACT, the LOWEST-EXTRACT is replaced by this value.

Go to Step 8.

Step 7: Move or copy the transform from PO to the end of WORK-PROJ. Add a new TAR-RECT to WORK-RECT-LIST, containing the transformed RECTANGLE coordinates and the mixing algorithm for the current transform. Go to Step 8.

Step 8: The transform has now been processed. If the current transform identifies the last transform in PO then go to Step 9, otherwise increment current transform to identify the next transform on PO and go to Step 2.

Step 9: Two new projections (DEV-PROJ and WORK-PROJ) have now been created. DEV-PROJ contains a list of transforms which when applied by the device to the source image, will not result in any errors due to overlapping rectangles. WORK-PROJ contains the remaining transforms (i.e. those which would cause a merging error if they were applied at the same time as the transforms contained in DEV-PROJ).

The source image is now sent to the device with the transforms contained in DEV-PROJ. If WORK-PROJ is empty go to Step 10, otherwise replace PO with the contents of WORK-PROJ and go to Step 1.

Step 10: The Process is complete.

In order to more effectively illustrate the operation of the preferred embodiment, two examples showing the operation for a) when the image portions share raster scan lines in the original image and b) when they do not share raster scan lines will be described. The conditions for detecting when two transforms will cause interference are shown in the following table.

| DO NOT SHARE RASTER SCAN LINES | | SHARE RASTER SCAN LINES | |
| --- | --- | --- | --- |
| NO TARGET OVERLAP | TARGET OVERLAP | NO TARGET OVERLAP | TARGET OVERLAP |
| no interference | possible incorrect image overlap | no interference | interference pattern |

FIGS. 4A and 4B show schematically the steps of the invention. A source image 40, has four rectangles (portions) T1,T2,T3,T4 that are to be the subjects of transform. The required result is shown as the image 41, with T2 being rotated through 90 degrees and overlapping T1, and T4 overlapping a replaced T3. The image shown at 42 illustrates the result that would be obtained if the transforms are carried out in the order T1,T2,T4,T3. T1 and T2 have a merged region 45 and T3 overlaps T4. FIG. 4B shows the intermediate step 43 and the result of the host processor detecting the possible overlap and interference. The transforms are then ordered as T1,T3,T2,T4. This results in the transforms on T1 and T3 being performed first and producing image 43. When T2 and T4 are performed the required result 44 is achieved.

Example application of the image merging algorithm

In this example, the source (IM1), is a bi-level monochrome image 100 pels wide by 100 pels deep, and with a horizontal and vertical resolution of 200 pels per inch. The target is an image display with a horizontal and vertical resolution of 100 pels per inch.

The following operations are used in this example:

Extract (left, right, top, bottom)—extract a rectangle from the specified pel coordinates of the source image.

Scale (x-scale, y-scale)—scale the extract rectangle by the specified factor in both the horizontal and vertical direction.

Orientate (n)—orientate (rotate) the extract rectangle clockwise by the specified number of right-angles.

Place (left, top, mix)—place the transformed rectangle into the target, with its top left corner at the specified pel position.

The following projection (PO) is to be applied to IM1 by the 3193, and the resulting transformed rectangles placed on the display surface:

T1 extract (10,40,10,40), scale (2,2), place (10,10,overpaint)

T2 extract (50,80,10,40), orientate (1), scale (2,2), place (30,10,overpaint)

T3 extract (50,80,75,95), scale (2,2), place (30,60,overpaint)

T4 extract (10,40,50,70), scale (2,2), place (10,50,overpaint)

The steps follow the flow diagram of FIG. 3.

Step 1: The following variables are created and initialized as follows:

DEV-PROJ and WORK-PROJ are empty (contain no transforms).

DEV-RECT-LIST and WORK-RECT-LIST are empty (contain no TAR-RECT records).

LOWEST-EXTRACT is set to −1.

CURRENT-TRANSFORM is set to the first transform in PO.

Step 2: TRANSFORMED-RECT for T1 is calculated to be (10,40,10,40,overpaint).

Step 3: The top edge coordinate of the extract rectangle is 10 which is greater than LOWEST-EXTRACT (−1) so go to Step 5.

Step 5: WORK-RECT-LIST is empty so go to Step 6.

Step 6: Add T1 to DEV-PROJ and add TRANSFORMED-RECT to DEV-RECT-LIST. The bottom edge coordinate of the extract rectangle is 40 which is greater than LOWEST-EXTRACT, so set lowest extract=40. Go to Step 8.

Step 8: T1 is not the last transform in PO, so set CURRENT-TRANSFORM to T2 and go to Step 2.

Step 2: TRANSFORMED-RECT for T2 is calculated to be (30,60,10,40,overpaint).

Step 3: The top edge coordinate of the extract rectangle is 10 which is not greater than LOWEST-EXTRACT (40) so go to Step 4.

Step 4: DEV-RECT-LIST contains the following records: (10,40,10,40,overpaint).

Overpaint is not commutative, and TRANSFORMED-RECT overlaps the first TAR-RECT in the DEV-RECT-LIST, so go to Step 7.

Step 7: Add T2 to WORK-PROJ and add TRANSFORMED-RECT to WORK-RECT-LIST. Go to Step 8.

Step 8: T2 is not the last transform in PO, so set CURRENT-TRANSFORM to T3 and go to Step 2.

Step 2: TRANSFORMED-RECT for T3 is calculated to be (30,60,60,80,overpaint).

Step 3: The top edge coordinate of the extract rectangle is 75 which is greater than LOWEST-EXTRACT (40) so go to Step 5.

Step 5: WORK-RECT-LIST contains the following records: (30,60,10,40,overpaint).

TRANSFORMED-RECT does not overlap any TAR-RECT in WORK-RECT-LIST so go to Step 6.

Step 6: Add T3 to DEV-PROJ and add TRANSFORMED-RECT to DEV-RECT-LIST. The bottom edge coordinate of the extract rectangle is 95 which is greater than LOWEST-EXTRACT, so set LOWEST-EXTRACT=95. Go to Step 8.

Step 8: T3 is not the last transform in PO, so set CURRENT-TRANSFORM to T4 and go to Step 2.

Step 2: TRANSFORMED-RECT for T4 is calculated to be (10,40,50,70,overpaint).

Step 3: The top edge coordinate of the extract rectangle is 50 which is less than LOWEST-EXTRACT (95) so go to Step 4.

Step 4: DEV-RECT-LIST contains the following records: (10,40,10,40,overpaint), (30,60,60,80,overpaint).

Overpaint is not commutative, and TRANSFORMED-RECT overlaps the second TAR-RECT in DEV-RECT-LIST, so go to Step 7.

Step 7: Add T4 to WORK-PROJ and add TRANSFORMED-RECT to WORK-RECT-LIST. Go to Step 8.

Step 8: T4 is the last transform in PO, so go to Step 9.

Step 9: Transmit the newly created projection DEV-PROJ to the image display (3193) along with a copy of the source image (IM1)

WORK-PROJ is not empty, so WORK-PROJ becomes the new PO, (i.e. PO is set to contain T2 and T4). Go to Step 1.

Step 1: The following variables are created and initialized as follows:

DEV-PROJ and WORK-PROJ are empty (contain no transforms).

DEV-RECT-LIST and WORK-RECT-LIST are empty (contain no TAR-RECT records).

LOWEST-EXTRACT is set to −1.

CURRENT-TRANSFORM is set to the first transform in PO.

Step 2: TRANSFORMED-RECT for T2 is calculated to be (30,60,10,40,overpaint).

Step 3: The top edge coordinate of the extract rectangle is 30 which is greater than LOWEST-EXTRACT (−1) so go to Step 5.

Step 5: WORK-RECT-LIST is empty so go to Step 6.

Step 6: Add T2 to DEV-PROJ and add TRANSFORMED-RECT to DEV-RECT-LIST. The bottom edge coordinate of the extract rectangle is 40 which is greater than LOWEST-EXTRACT, so set LOWEST-EXTRACT=40. Go to Step 8.

Step 8: T2 is not the last transform in PO, so set CURRENT-TRANSFORM to T4 and go-to Step 2.

Step 2: TRANSFORMED-RECT for T4 is calculated to be (10,40,50,70,overpaint).

Step 3: The top edge coordinate of the extract rectangle is 50 which is greater than LOWEST-EXTRACT (40) so go to Step 5.

Step 5: WORK-RECT-LIST is empty so go to Step 6.

Step 6: Add T4 to DEV-PROJ and add TRANSFORMED-RECT to DEV-RECT-LIST. The bottom edge coordinate of the extract rectangle is 70 which is greater than LOWEST-EXTRACT, so set lowest extract=70. Go to Step 8.

Step 8: T4 is the last transform in PO, so go to Step 9.

Step 9: Transmit the newly created projection DEV-PROJ to the image display (3193) along with a copy of the source image (IM1).

WORK-PROJ is now empty, so go to Step 10.

Step 10: The process is now complete.

In this example two transmissions were required. In the first, IM1 was sent with transforms T1 and T3, and in the second, with T2 and T4.

We claim:

1. A data display system in which image data are stored as a series of raster scan pel definition signals in a data processor system (10), and in which the position and size of selected portions of an image to be displayed on a display screen of a display device (12) connected to said data processor system can be transformed in a single pass in response to input signals received by said data processor system from a controlled input device (13,14,15) communicating with said data processor system, the system comprising:

a display device control program store in which are stored control programs for a plurality of transform operations;

means for receiving image transform orders, said means being responsive to said controlled input device;

means for determining when two or more concurrent transforms of portions of an image will cause the image portions to be displayed on common areas of the display screen, said means being connected to said means for receiving image transform orders;

means for ordering by priority and creating an ordered list of the image transforms received by said means for receiving, said means for ordering and creating operating in response to said means for determining and said means for receiving and;

means to transmit signals to the display device, said signals defining the ordered list of transforms in response to said means for ordering and creating, so that when the image pel definition signals are transmitted to the display device, where image portions occupy common areas of the display screen the pel definition signals relating to higher priority portions of the image control the final content of the common areas of the displayed image.

2. A method of operating in a data display system in which image data are stored as a series of raster scan pel definition signals in a data processor system (10), and the position and size of selected portions of an image to be displayed on a display screen of a display device (12) can be transformed in a single pass in response to input signals received from a controlled input device (13,14,15), the method comprising the steps of:

(a) storing signals that represent a projection list of transform operations in response to input signals from said controlled input device;

(b) determining from said projection list when concurrent transfers will cause two image portions to occupy a common area of a display screen; and (c) separating the projection list into a first list which contains the transforms that do not result in interface or overlay of image portions and a second list that is ordered so that when image pel definition signals are transmitted to the display device the pel definition signal relating to the higher priority portions of said image control the final content of the common areas of the displayed image where image portions occupy common areas of the display screen.

3. A method as claimed in claim 2, including the step of transmitting signals representing the first and second lists from said data processor system to the display device whereby the transforms indicated by the first list are performed at the display device before the transforms indicated by the second list.

* * * * *